(12) United States Patent
Aimone

(10) Patent No.: US 11,726,381 B2
(45) Date of Patent: Aug. 15, 2023

(54) MODULATOR ARRANGEMENT AND METHOD FOR FABRICATING A MODULATOR ARRANGEMENT

(71) Applicant: Fraunhofer-Gesellschaft zur Förderung der angewandten Forschung e.V., Munich (DE)

(72) Inventor: Alessandro Aimone, Versailles (FR)

(73) Assignee: Fraunhofer-Gesellschaft zur Förderung der angewandten Forschung e.V., Munich (DE)

( * ) Notice: Subject to any disclaimer, the term of this patent is extended or adjusted under 35 U.S.C. 154(b) by 275 days.

(21) Appl. No.: 16/971,367

(22) PCT Filed: Feb. 21, 2019

(86) PCT No.: PCT/EP2019/054320
§ 371 (c)(1),
(2) Date: Aug. 20, 2020

(87) PCT Pub. No.: WO2019/162381
PCT Pub. Date: Aug. 29, 2019

(65) Prior Publication Data
US 2020/0393735 A1    Dec. 17, 2020

(30) Foreign Application Priority Data
Feb. 21, 2018  (EP) ..................... 18157876

(51) Int. Cl.
*G02F 1/035* (2006.01)
*G02F 1/295* (2006.01)
(Continued)

(52) U.S. Cl.
CPC .............. *G02F 1/225* (2013.01); *G02F 1/212* (2021.01); *G02F 2201/18* (2013.01)

(58) Field of Classification Search
CPC ....... G02F 1/225; G02F 1/212; G02F 2201/18
(Continued)

(56) References Cited

U.S. PATENT DOCUMENTS 7,203,427 B2 * 4/2007 Naik .................... H04B 10/299
398/175
7,483,600 B2 * 1/2009 Achiam ............... G02B 6/4225
385/14

(Continued)

FOREIGN PATENT DOCUMENTS

WO        2007133066 A2    11/2007

OTHER PUBLICATIONS

Daly et al., "Crosstalk Reduction in Intersecting Rib Waveguides", Journal of Lightwave Technology, 1996, pp. 1695-1698, vol. 14, No. 7.
(Continued)

*Primary Examiner* — Kaveh C Kianni
*Assistant Examiner* — Hung Q Lam
(74) *Attorney, Agent, or Firm* — The Webb Law Firm

(57) ABSTRACT

The present disclosure relates to a modulator arrangement, including at least a first and a second electro-optical Mach-Zehnder modulator. At least one optical waveguide of the first Mach-Zehnder modulator crosses at least one optical waveguide of the second Mach-Zehnder modulator. A method for fabricating a modulator arrangement is also disclosed herein.

17 Claims, 2 Drawing Sheets

(51) Int. Cl.
  *G02B 6/12*  (2006.01)
  *G02F 1/225*  (2006.01)
  *G02F 1/21*  (2006.01)
(58) Field of Classification Search
  USPC .............................. 385/9, 14, 20, 22, 39, 49
  See application file for complete search history.

(56) References Cited

U.S. PATENT DOCUMENTS

| | | |
|---|---|---|
| 9,746,743 B1 * | 8/2017 | Rabiei ................ G02B 6/12009 |
| 2002/0159684 A1 | 10/2002 | Sun et al. |
| 2013/0170782 A1 | 7/2013 | Evans et al. |

OTHER PUBLICATIONS

Kato et al., "10-GB/s—80-km operation of full C-band InP MZ modulator with linear-accelerator-type tiny in-line centipede electrode structure directly driven by logic IC of 90-nmCMOS process", Optical Society of America, 2011, 3 pages.

Saavedra et al., "Multi-Channel Mach-Zehnder IQ Modulator PICs on InP for Hybrid OFDM Transmitter Integration", 18th International Conference on Transparent Optical Networks (ICTON), 2016, 4 pages.

Zhang et al., "A CMOS-Compatible, Low-Loss, and Low-Crosstalk Silicon Waveguide Crossing", IEEE Photonics Technology Letters, 2013, pp. 422-425, vol. 25, No. 5.

* cited by examiner

MODULATOR ARRANGEMENT AND METHOD FOR FABRICATING A MODULATOR ARRANGEMENT

CROSS-REFERENCE TO RELATED APPLICATIONS

This application is the United States national phase of International Application No. PCT/EP2019/054320 filed Feb. 21, 2019, and claims priority to European Patent Application No. 18157876.6 filed Feb. 21, 2018, the disclosures of which are hereby incorporated by reference in their entirety.

BACKGROUND OF THE INVENTION

1. Field of the Invention

The present disclosure relates to a modulator arrangement and a method for fabricating a modulator arrangement.

2. Technical Considerations

Modulator arrangements comprising a plurality of parallel Mach-Zehnder modulators are known to be e.g. employed as high frequency multichannel transmitters in optical data communications. For example, the article "Multi-Channel Mach-Zehnder IQ Modulator PICs on InP for Hybrid OFDM Transmitter Integration", B. G. Saavedra et al., IEEE, 2016 18th International Conference on Transparent Optical Networks (ICTON) describes an integrated photonic circuit having a modulator arrangement comprising eight Mach-Zehnder modulators. However, the arrangement of multiple parallel Mach-Zehnder modulators and their connections to driver devices require a rather large chip size and/or module space.

SUMMARY OF THE INVENTION

It is an object underlying the proposed solution to reduce the space requirements of such modulator arrangements.

According to the proposed solution, a modulator arrangement is provided that comprises:
- at least a first and a second electro-optical Mach-Zehnder modulator, wherein
- at least one optical waveguide of the first Mach-Zehnder modulator crosses at least one optical waveguide of the second Mach-Zehnder modulator.

Permitting at least one optical waveguide of one of the Mach-Zehnder modulators to cross at least one optical waveguide of the other Mach-Zehnder modulator in particular allows the Mach-Zehnder modulators to be arranged in such a way that the realization of interconnects between the modulators and other (in particular electronic) components, such as RF drivers for supplying RF voltages (e.g. in the form of amplifying ICs) to the modulators, is facilitated. Further, more reliable interconnects could be fabricated in a cost efficient way and the overall space requirement of the modulator arrangement might be reduced. Moreover, the Mach-Zehnder modulators might be disposed closer to one another, which may improve the frequency characteristics of the modulator arrangement. The optical waveguides crossing one another are e.g. optically integrated waveguides, i.e. optical waveguides that are formed by structured material layers (e.g. semi-conductor layers) deposited on a (e.g. common) substrate.

According to an embodiment, each one of the Mach-Zehnder modulators comprises two optical waveguides in the form of two waveguide arms extending at least between an optical splitter and an optical combiner of the Mach-Zehnder modulator, wherein at least one optical waveguide of one of the Mach-Zehnder modulators may cross the waveguide arms of the other Mach-Zehnder modulator. For example, an input or output waveguide of one of the modulators crosses the waveguide arms of the other modulator. In particular, the both waveguide arms of a first one of the Mach-Zehnder modulators are connected to the same optical splitter and the same optical combiner, respectively. Similarly, the waveguide arms of the second Mach-Zehnder modulator may be connected to the same optical splitter and the same optical combiner, wherein the splitter and the combiner of the second Mach-Zehnder modulator are different from the splitter and the combiner, respectively, of the first Mach-Zehnder modulator. For example, the splitter and the combiner of the second Mach-Zehnder modulator are arranged in a distance from the splitter and the combiner, respectively, of the first Mach-Zehnder modulator.

For example, the optical splitter of the first Mach-Zehnder modulator distributes light coupled into an input waveguide of the first Mach-Zehnder modulator to the waveguide arms of the first Mach-Zehnder modulator, while the optical combiner of the first Mach-Zehnder modulator merges the light guided in the waveguide arms of the first Mach-Zehnder modulator into an output waveguide of the first Mach-Zehnder modulator, and the optical splitter of the second Mach-Zehnder modulator distributes light coupled into an input waveguide of the second Mach-Zehnder modulator to the waveguide arms of the second Mach-Zehnder modulator, while the optical combiner of the second Mach-Zehnder modulator merges the light guided in the waveguide arms of the second Mach-Zehnder modulator into an output waveguide of the second Mach-Zehnder modulator.

According to another embodiment, each one of the waveguide arms of one of the Mach-Zehnder modulators crosses both waveguide arms of the other Mach-Zehnder modulator.

It is also possible that both waveguide arms of the first Mach-Zehnder modulator cross both waveguide arms of the second Mach-Zehnder modulator. That is, the crossing between the optical waveguides is located in the interferometer section of both the first and the second modulator. However, it is also conceivable that the crossing between the optical waveguides of the modulators is realized between a single waveguide (e.g. an input or output waveguide) of the first Mach-Zehnder modulator and a single waveguide (e.g. an output or input waveguide) of the second Mach-Zehnder modulator.

The optical splitter is used to distribute light coupled into an input waveguide of the modulators to the modulator arms, while the optical combiner merges the lights guided in the waveguide arms into an output waveguide of the modulators. For example, the splitter and/or the combiner are formed as Y-branches and/or as multimode interference (MMI) structures. The waveguide arms of each one of the modulators at least essentially may run parallel to one another.

Further, the modulator arrangement according to the proposed solution may of course comprise more than two Mach-Zehnder modulators. Moreover, the modulator arrangement may be implemented as an optically integrated device (a photonic chip), i.e. at least the optical structures of the modulators are monolithically integrated on a common substrate (e.g. using Indium phosphide technology).

The crossing between the optical waveguides may be designed to have low loss and low cross talk. For example, the at least one optical waveguide of the first Mach-Zehnder modulator crosses the at least one optical waveguide of the second Mach-Zehnder modulator by intersecting that optical waveguide. Such an intersecting crossing may be realized by an intersecting X-crossing as disclosed e.g. in the article "Cross talk reduction intersecting waveguides", M. G. Daly et al., Journal of light wave technology, Vol. 14, No. 7, July 1996, which in that respect is enclosed by reference herewith.

However, it is also possible that the crossing between the optical waveguides is not formed by intersections. Rather, the at least one optical waveguide of the first Mach-Zehnder modulator may extend below or above the optical waveguide of the second Mach-Zehnder modulator at least in a crossing region in which the two optical waveguide region cross one another. The "crossing region" in particular is a region that comprises all existing crossings between optical waveguides of the at least two modulators. For example, the "crossing region" may be delimited by the crossings between the optical waveguides.

Furthermore, at least one of the crossing optical waveguides may comprise at least one curved section; e.g. the optical waveguide has an S-shape. It is noted that also the waveguide arms of at least one of the modulators may have at least one curved section, wherein despite the curved section, the waveguide arms of the first modulator and/or the second modulator may run at least essentially parallel to one another.

According to another embodiment, the Mach-Zehnder modulators each comprise an RF electrode section for supplying an RF voltage to the Mach-Zehnder modulator, wherein the RF electrode section is connected to at least one driver (which e.g. comprises an amplifier for supplying an amplified RF voltage to the RF electrode section).

For example, the RF electrode sections each comprise at least one waveguide electrode arranged on one of the waveguide arms and at least one waveguide electrode arranged on the other waveguide arm of the modulator, the waveguide electrodes being connected to the driver (e.g. by means of wirebonds). It is also possible that a plurality of first waveguide electrodes are arranged on one of the waveguide arms and a plurality of second waveguide electrodes are arranged on the second waveguide arm of the respective modulator, wherein the first and the second waveguide electrodes might be connected to the same driver. However, it is also possible that the waveguide electrodes are connected to multiple drivers, wherein each one of the drivers is connected to one of the first waveguide electrodes and one of the second waveguide electrodes.

For example, the Mach-Zehnder modulators are arranged in such a way that—when viewed along main extension direction of at least one of the Mach-Zehnder modulators—the RF electrode sections are located on opposite sides of the above-mentioned crossing region. The "main extension direction" of the modulators may correspond to the light input and/or light output direction or the orientation of the waveguide arms within the RF electrode section. For example, the RF electrode sections of the two modulators are at least essentially arranged on the same vertical position, i.e. on a common straight-line extending parallel to the main extension direction of the modulators. It is even possible that the modulators are arranged in such a way that an input port of the first Mach-Zehnder modulator is located at least essentially on the same vertical position as an output port of the second Mach-Zehnder modulator, i.e. the input port of the first modulator and the output port of the second modulator are located on a straight-line extending parallel to the main extension direction of the modulators.

Further, if multiple crossings are realized by crossing between the waveguide arms of the first and second modulator, the RF electrode section of the first Mach-Zehnder modulator may be located between the optical splitter and the crossing region, while the RF electrode section of the second Mach-Zehnder modulator is located between the crossing region and the optical combiner.

It is also conceivable that the at least one driver assigned to the first Mach-Zehnder modulator and the at least one driver assigned to the second Mach-Zehnder modulator—when viewed in a direction perpendicular to the main extension direction of at least one of the Mach-Zehnder modulators—are located on the same side of the crossing region. For example, the Mach-Zehnder modulators are arranged on a common substrate, and wherein the at least one driver assigned to the first Mach-Zehnder modulator and the at least one driver assigned to the second Mach-Zehnder modulator are arranged on the same side of the substrate. In particular, the configuration allows the drivers to be arranged on the same side of a chip (e.g. an integrated photonic chip) that comprises the at least two Mach-Zehnder modulators.

At least one of the Mach-Zehnder modulators might also comprise a light influencing section located in a distance from the RF electrode section. For example, the RF electrode section and the light influencing section of the first and/or the second Mach-Zehnder modulator are located on opposite sides of the crossing region.

The light influencing section might comprise at least one opto-electronically active and/or at least one opto-electronically passive section. For example, the opto-electronically active section comprises at least one electrode connected to a DC source. Such a section might be configured as a phase shifting unit and/or a monitor diode, wherein the phase shifting unit may comprise at least one waveguide electrode connected to the DC source for supplying a voltage across the waveguides. The opto-electronically passive section may comprise a polarizer.

As already mentioned above, the modulator arrangement according to the proposed solution may comprise more than two Mach-Zehnder modulators. For example, the modulator arrangement comprises at least two pairs of Mach-Zehnder modulators, wherein the Mach-Zehnder modulators of each pair may be configured and arranged in such a way that at least one optical waveguide of the first Mach-Zehnder modulator of the pair crosses at least one optical waveguide of the second Mach-Zehnder modulator of the pair. For example, the Mach-Zehnder modulators of each one of the pairs are arranged in such a way that the waveguide arms of one of the Mach-Zehnder modulators of the pair cross the waveguide arms of the other Mach-Zehnder modulator of the pair. Further, the optical waveguides of the modulators of one of the pairs may not cross any of the optical waveguides of the modulators of the other pair.

The solution is also related to an optical (e.g. terabit) transmitter and/or communication network comprising a modulator arrangement as described herein.

The solution also relates to a method for fabricating a modulator arrangement, in particular as described above, comprising the step of generating at least a first and a second electro-optical Mach-Zehnder modulator, wherein at least one optical waveguide of the first Mach-Zehnder modulator crosses at least one optical waveguide of the second Mach-Zehnder modulator.

For example, the waveguide arms of the first Mach-Zehnder modulators cross the waveguide arms of the second Mach-Zehnder modulator. Of course, other embodiments described above with respect to the modulator arrangement according to the proposed solution can be also used for refining the method according to the proposed solution.

BRIEF DESCRIPTION OF THE DRAWINGS

Embodiments of the proposed solution will be described in detail hereinafter with reference to the drawings, in which.

DETAILED DESCRIPTION

Figure 1:
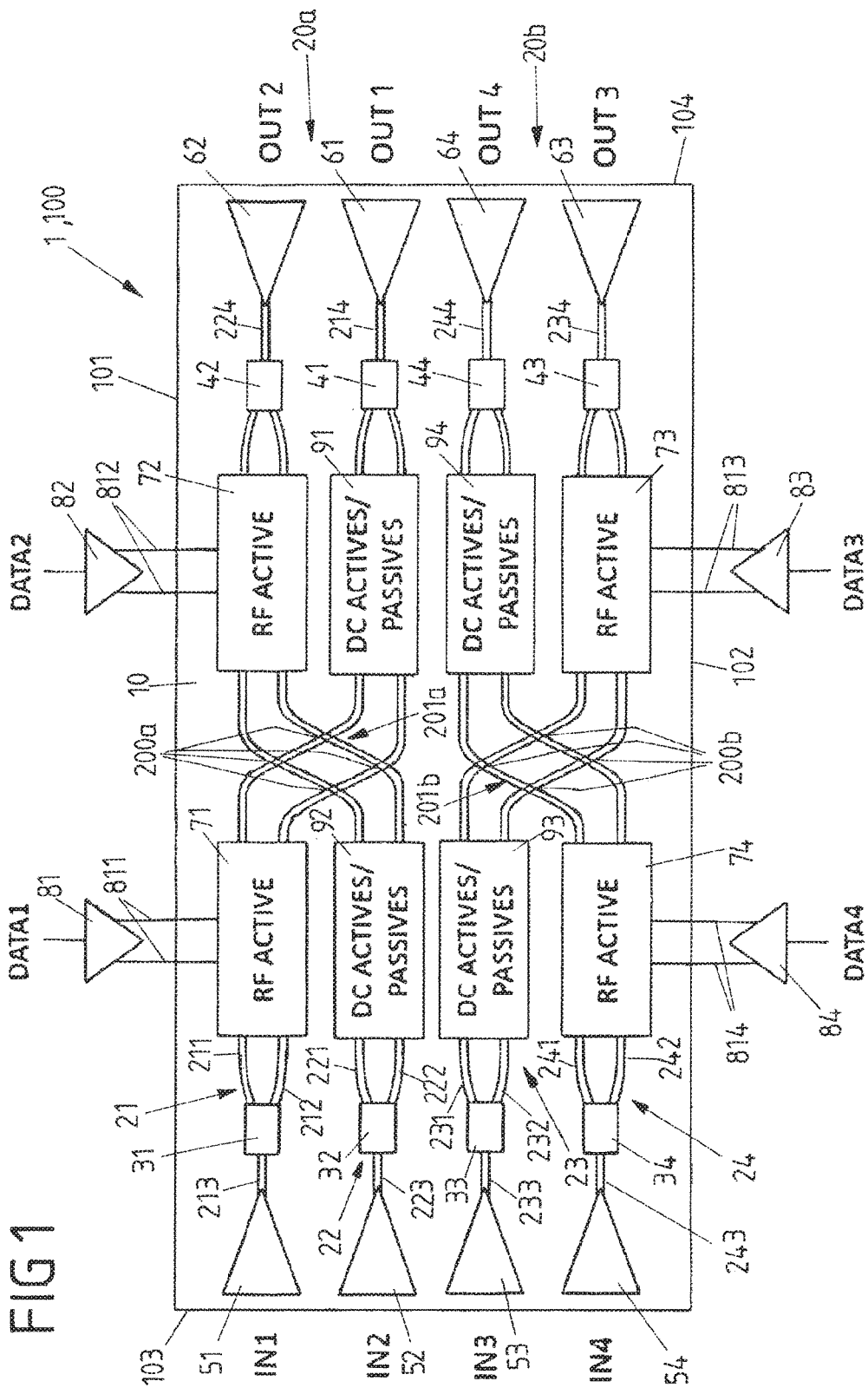
FIG. 1 shows a modulator arrangement according to an embodiment of the invention.

The modulator arrangement 1 according to the solution shown in FIG. 1 comprises four Mach-Zehnder modulators 21-24 arranged in two modulator pairs 20a, 20b. Each one of the modulators 21-24 comprises two optical waveguides in the form of waveguide arms 211, 212, 221, 222, 231, 232, 241, 242 extending between an optical splitter 31-34 and an optical combiner 41-44.

Further, each one of the modulators 21-24 comprises an (optional) input mode converter 51-54 for adapting an optical mode guided in an optical input fiber (not shown) to an optical mode that can be guided in an input waveguide 213, 223, 233, 243 of the modulator 21-24 and an (also optional) output mode converter 61-64 for adapting an optical mode guided in an output waveguide 214, 224, 234, 244 of the modulators 21-24 to an optical mode that can be guided in an output fiber (not shown). The input and output mode converters realize input ports ("IN1", "IN2", "IN3", "IN4") and output ports ("OUT1", "OUT2", "OUT3", "OUT4") of the modulator arrangement 1, respectively. The light guided in the input waveguides 213, 223, 233, 243 is distributed to the waveguide arms 211, 212, 221, 222, 231, 232, 241, 242 by means of the splitters 31-34 and merged into the output waveguides 214, 224, 234, 244 by means of the combiners 41-44.

Each one of the waveguide arms 211, 212, 221, 222, 231, 232, 241, 242 comprises a curved section in the form of an S-shaped section, wherein the Mach-Zehnder modulators 21-24 of each one of the modulator pairs 20a, 20b are arranged in such a way that the waveguide arms 211, 212, 231, 232 of a first one of the modulators 21, 23 of one modulator pair 20a, 20b crosses (e.g. intersects) the waveguide arms 221, 222, 241, 242 of the second modulator 22, 24 of that modulator pair 20a, 20b. The crossing portions 200a, 200b of the waveguide arms, i.e. those waveguide portions where the waveguide arms 211, 212, 231, 232 of the first modulators 21, 23 cross the waveguide arms 221, 222, 241, 242 of the second modulators 22, 24, define crossing regions 201a, 201b, wherein the crossing portions 200a, 200b may define the outer contours of these crossing regions 201a, 201b.

It is noted that the two waveguide arms 211, 212, 221, 222, 231, 232, 241, 242 of each one of the modulators 21-24 at least essentially run parallel to one another. Further, the waveguide arms 211, 212, 221, 222, 231, 232, 241, 242 may comprise straight sections between the splitters 31-34 and the curved section and/or between the curved section and the combiners 41-44.

Moreover, each one of the Mach-Zehnder modulators 21-24 comprises an RF electrode section 71-74 for supplying an RF voltage to at least one of the waveguide arms 211, 212, 221, 222, 231, 232, 241, 242 of the respective modulator 21-24. Each one of the RF electrode sections 71-74 is connected to a driver 81-84 that supplies an amplified RF voltage to the RF electrode section depending on an incoming data stream ("DATA1", "DATA2", "DATA3", "DATA4"). Because the waveguide arms 211, 212, 221, 222, 231, 232, 241, 242 of the Mach-Zehnder modulators 21-24 of the modulator pairs 20a, 20b are allowed to cross one another, the modulators 21-24 can be arranged in such a way that both RF electrode sections 71, 72 and 73, 74 of the modulator pairs 20a, 20b are located on the same outer side of the modulator arrangement 1.

More particularly, the RF electrode sections 71, 72 and 73, 74 of the modulator pairs 20a, 20b are located on the same outer side of the crossing regions 201a, 201b. That arrangement, in turn, permits the drivers 81-84 of each one of the modulator pairs 20a, 20b to be arranged on the same side of the modulator arrangement 1, too. For example, the modulator pairs 20a, 20b are arranged on a common substrate 10 such that the modulator arrangement is implemented as an optical chip 100. The drivers 81, 82 assigned to the modulators 21, 22 of the first modulator pair 20a are arranged on a first side (edge) 101 of the chip 100, while the drivers 83, 84 assigned to the modulators 23, 24 of the second modulator pair 20b are arranged on a second, opposite side 102 of chip 100. The optical input ports IN1, IN2, IN3, IN4 and the optical output ports OUT1, OUT2, OUT3, OUT4 are located on the shorter sides 103, 104 of chip 100. The chip sides 103, 104 thus may form optical facets.

Because of the outward location of the RF electrode sections 71-74 of the modulators 21-24 the fabrication of the required interconnects between the drivers 81-84 and the RF electrode sections 71-74 is simplified and overall space requirement of the modulator arrangement 1 decreases (i.e. the chip size is reduced). Further, the interconnects between the drivers 81-84 and the RF electrode sections 71-74 may be realized by means of wirebonds 811-814 extending between the drivers 81-84 and the RF electrode sections 71-74.

Moreover, the modulators 21-24 of each one of the modulator pairs 20a, 20b could be arranged in such a way that the RF electrode sections 71-74 of the modulator pairs 20a, 20b are located at least essentially on the same vertical position (i.e. the same position perpendicular to the main extension direction of the modulators 21-24) such that the RF electrode sections 71, 72 and 73, 74, respectively, are arranged on opposite sides of the crossing region 201a, 201b and on a (imaginary) straight line between the input port IN1, IN3 of the first modulators 21, 23 and the output port OUT1, OUT3 of the second modulators 22, 24.

Figure 2:
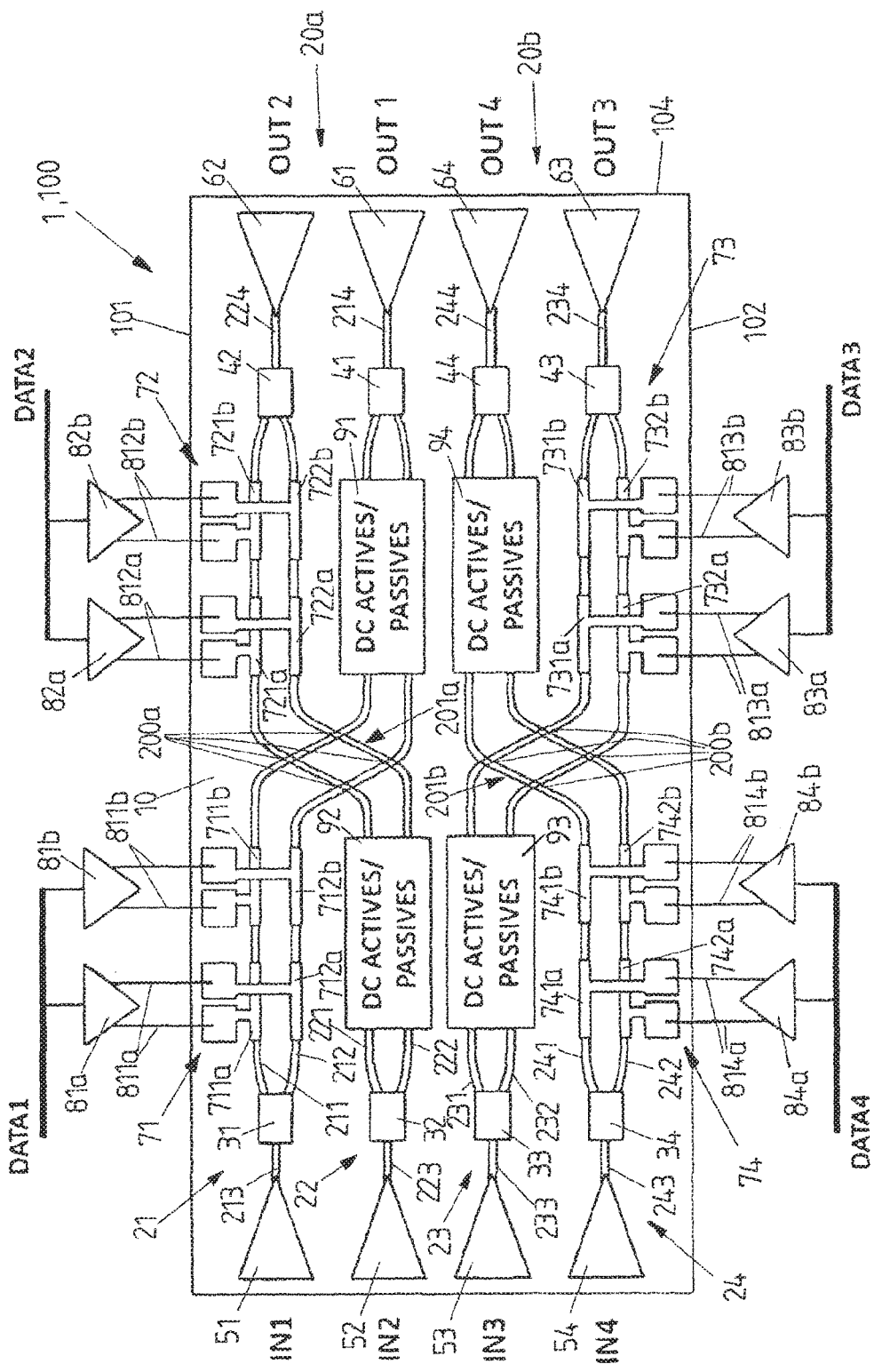
FIG. 2 shows a modulator arrangement according to another embodiment of the invention.

Each one of the RF electrode sections 71-74 may comprise at least one first waveguide electrode arranged on one waveguide arm 211-241 and at least one second waveguide electrodes arranged on the other waveguide arm 212-242 of the respective modulator 21-24. Examples of such waveguide electrodes are shown in FIG. 2. It is further noted that it is also conceivable that the RF electrode sections 71-74 extend into the curved region of the waveguide arms and may even extend over at least essentially the entire length of the waveguide arms 211, 212, 221, 222, 231, 232, 241, 242. Further, as already noted above, the crossings 200a, 200b between the waveguide arms of the modulator pairs 20a, 20b may be realized as intersections between the waveguide arms. However, it is also possible that the crossing waveguide arms in the region of the crossings 200*a*, 200*b* merely extend in different heights (perpendicular to substrate 10) such that the cross one another without intersecting one another. For example, the first waveguide arms 211 of the first modulator 21 in the region of the crossing 200*a* with the waveguide arms 221, 222 of the second modulator 22 may extend below or above the waveguide arms 221, 222.

The Mach-Zehnder modulators 21-24 further may comprise a light influencing section in the form of an opto-electronically active and/or passive section 91-94. For example, the sections 91-94 may comprise at least one waveguide electrode for applying a DC voltage across at least one of the waveguide arms 211, 212, 221, 222, 231, 232, 241, 242 of the respective modulator 21-24. Further, the sections 91-94 similarly to the RF electrode sections 71-74 at least essentially are arranged on the same vertical position and an opposite sides of the corresponding crossing region 201*a*, 201*b*. Moreover, the RF electrode sections 71, 72 of the first modulator pair 20*a* are arranged vertically above the sections 92, 91, respectively, of this modulator pair 20*a*, while the RF electrode sections 73, 74 of the other modulator pair 20*b* are arranged vertically below the sections 94 and 93, respectively, of that modulator pair. Thus, the opto-electronically active and/or passive sections 91-94 are disposed on an inner side of the RF electrode sections 71-74.

As shown in FIG. 1, a single driver 81-84 may be connected to the corresponding RF electrode sections 71-74. However, it is also possible that multiple drivers are connected to the electrode sections 71-74 as shown in FIG. 2.

According to FIG. 2, two drivers 81*a*, 81*b*, 82*a*, 82*b*, 83*a*, 83*b*, 84*a*, 84*b* are connected to one RF electrode section 71-74. Each one of the RF electrode sections 71-74 comprises two pairs of waveguide electrodes (realizing a segmented electrode configuration), each pair consisting of a first and a second waveguide electrode 711*a*, 711*b*, 721*a*, 721*b*, 731*a*, 731*b*, 741*a*, 741*b*, 712*a*, 712*b*, 722*a*, 722*b*, 732*a*, 732*b*, 742*a*, 742*b*. The first waveguide electrodes 711*a*, 711*b*, 721*a*, 721*b*, 731*a*, 731*b*, 741*a*, 741*b* are arranged on a first waveguide arm 211, 221, 231, 241 of the modulator 21-24, while the second waveguide electrodes 712*a*, 712*b*, 722*a*, 722*b*, 732*a*, 732*b*, 742*a*, 742*b* are arranged on the second waveguide arm 212, 222, 232, 242 of the modulators 21-24. The waveguide electrodes are arranged on top of the corresponding waveguide arm, wherein the waveguide arms might be realized as rib waveguides.

Each one of the drivers 81*a*, 81*b*, 82*a*, 82*b*, 83*a*, 83*b*, 84*a*, 84*b* is connected to one of the waveguide electrode pairs, i.e. to a first and a second waveguide electrode. It is of course also conceivable that more than two drivers are assigned to one RF electrode section 71-74. Using multiple drivers the waveguide electrodes may be driven individually (independent from one another) as described, for example, in the publication "10 Gb/s-80-km operation of full C-band InP MZ modulator with linear-accelerator-type tiny in-line centipede electrode structure directly driven by logic IC of 90-nm CMOS process", T. Kato et al., Optical Fiber Communication Conference and Exposition, 2011, p. 1.

It is further noted, that even when using a single driver per RF electrode section, only (as shown in FIG. 1), each one of the RF electrode sections 71-74 may comprise multiple waveguide electrode pairs as shown in FIG. 2, wherein the multiple waveguide electrode pairs may be part of a travelling wave electrode structure.

The modulator arrangement 1 depicted in FIG. 2 may be a 4×SEMZM (segmented electrode Mach-Zehnder modulator) that might be used for 4λ-PAM (pulse amplitude modulation) applications. The modulator arrangement shown in FIG. 2 might require at least essentially only the space of a conventional 2×SEMZM array.

It is also noted that instead of the crossings between the waveguide arms 211, 212, 221, 222, 231, 232, 241, 242 of the modulators 21-24 the modulators 21-24 might be configured and arranged in such a way that the input or output waveguide 213, 223, 233, 243, 214, 224, 234, 244 of one of the modulators crosses the waveguide arms of another modulator of the corresponding modulator pair. Further, it is even conceivable that there are no crossing between the waveguide arms of the modulators. Rather, the at least one crossing may be located outside the interferometer section of the modulator, e.g. by means of a crossing between an input or output waveguide of one of the modulators and an output and input waveguide, respectively, of the other modulator.

The invention claimed is:

1. A modulator arrangement, comprising at least a first and a second electro-optical Mach-Zehnder modulator, wherein:

at least one optical waveguide of the first Mach-Zehnder modulator crosses at least one optical waveguide of the second Mach-Zehnder modulator;

each one of the Mach-Zehnder modulators comprises two optical waveguides in the form of two waveguide arms extending at least between an optical splitter and an optical combiner of the Mach-Zehnder modulators, wherein at least one optical waveguide of one of the Mach-Zehnder modulators crosses the waveguide arms of the other Mach-Zehnder modulator; and the Mach-Zehnder modulators each comprise an RF electrode section for supplying an RF voltage to the corresponding Mach-Zehnder modulator, wherein each one of the RF electrode sections is connected to at least one driver, wherein the RF electrode section of the first Mach-Zehnder modulator is located between the optical splitter and the crossing region, while the RF electrode section of the second Mach-Zehnder modulator is located between the crossing region and the optical combiner.

2. The modulator arrangement as claimed in claim 1, wherein the optical splitter of the first Mach-Zehnder modulator distributes light coupled into an input waveguide of the first Mach-Zehnder modulator to the waveguide arms of the first Mach-Zehnder modulator, while the optical combiner of the first Mach-Zehnder modulator merges the light guided in the waveguide arms of the first Mach-Zehnder modulator into an output waveguide of the first Mach-Zehnder modulator, and the optical splitter of the second Mach-Zehnder modulator distributes light coupled into an input waveguide of the second Mach-Zehnder modulator to the waveguide arms of the second Mach-Zehnder modulator, while the optical combiner of the second Mach-Zehnder modulator merges the light guided in the waveguide arms of the second Mach-Zehnder modulator into an output waveguide of the second Mach-Zehnder modulator.

3. A modulator arrangement, comprising at least a first and a second electro-optical Mach-Zehnder modulator, wherein:

at least one optical waveguide of the first Mach-Zehnder modulator crosses at least one optical waveguide of the second Mach-Zehnder modulator;

each one of the Mach-Zehnder modulators comprises two optical waveguides in the form of two waveguide arms extending at least between an optical splitter and an optical combiner of the Mach-Zehnder modulators, wherein at least one optical waveguide of one of the Mach-Zehnder modulators crosses the waveguide arms of the other Mach-Zehnder modulator; and each one of the waveguide arms of the Mach-Zehnder modulators crosses both waveguide arms of the other Mach-Zehnder modulator.

4. The modulator arrangement as claimed in claim 1, wherein the at least one optical waveguide of the first Mach-Zehnder modulator crosses the at least one optical waveguide of the second Mach-Zehnder modulator by intersecting that optical waveguide.

5. The modulator arrangement as claimed in claim 1, wherein at least one of the crossing optical waveguides comprises at least one curved section.

6. The modulator arrangement as claimed in claim 1, wherein the Mach-Zehnder modulators each comprise an RF electrode section for supplying an RF voltage to the corresponding Mach-Zehnder modulator, wherein each one of the RF electrode sections is connected to at least one driver.

7. The modulator arrangement as claimed in claim 6, wherein the Mach-Zehnder modulators are arranged in such a way that - when viewed along a main extension direction of at least one of the Mach-Zehnder modulators - the RF electrode sections are located on opposite sides of a crossing region in which the at least one optical waveguide of the first Mach-Zehnder modulator crosses the at least one optical waveguide of the second Mach-Zehnder modulator.

8. The modulator arrangement as claimed in claim 6, wherein the at least one driver assigned to the first Mach-Zehnder modulator and the at least one driver assigned to the second Mach-Zehnder modulator - when viewed in a direction perpendicular to the main extension direction of at least one of the Mach-Zehnder modulators - are located on the same side of a crossing region in which the at least one optical waveguide of the first Mach-Zehnder modulator crosses the at least one optical waveguide of the second Mach-Zehnder modulator.

9. The modulator arrangement as claimed in claim 6, wherein the Mach-Zehnder modulators are arranged on a common substrate, and wherein the at least one driver assigned to the first Mach-Zehnder modulator and the at least one driver assigned to the second Mach-Zehnder modulator are arranged on the same side of the substrate.

10. The modulator arrangement as claimed in claim 6, wherein at least one of the Mach-Zehnder modulators comprises a light influencing section located in a distance from the RF electrode section.

11. A modulator arrangement, comprising at least a first and a second electro-optical Mach-Zehnder modulator, wherein:

at least one optical waveguide of the first Mach-Zehnder modulator crosses at least one optical waveguide of the second Mach-Zehnder modulator;

each one of the Mach-Zehnder modulators comprises two optical waveguides in the form of two waveguide arms extending at least between an optical splitter and an otpical combiner of the Mach-Zehnder modulators, wherein at least one optical waveguide of one of the Mach-Zehnder modulators crosses the waveguide arms of the other Mach-Zehnder modulator; and the Mach-Zehnder modulators each comprise an RF electrode section for supplying an RF voltage to the corresponding Mach-Zehnder modulator, wherein each one of the RF electrode sections is connected to at least one driver, wherein at least one of the Mach-Zehnder modulators comprises a light influencing section located in a distance from the RF electrode section, wherein the waveguide arms of the first Mach-Zehnder modulator cross the waveguide arms of the second Mach-Zehnder modulator in a crossing region, and wherein the RF electrode section and the light influencing section of the Mach-Zehnder modulator are located on opposite sides of the crossing region.

12. The modulator arrangement as claimed in claim 10, wherein the light influencing section is formed by at least one opto-electronically active and/or at least one opto-electronically passive section.

13. The modulator arrangement as claimed in claim 12, wherein the opto-electronically active section comprises at least one electrode connected to a DC source.

14. The modulator arrangement as claimed in claim 1, comprising at least two pairs of Mach-Zehnder modulators, each pair comprising a first and a second Mach-Zehnder modulator, wherein the Mach-Zehnder modulators of each pair are configured and arranged in such a way that at least one optical waveguide of the first Mach-Zehnder modulator of the pair crosses at least one optical waveguide of the second Mach-Zehnder modulator of the pair.

15. The modulator arrangement as claimed in claim 2, wherein each one of the waveguide arms of one of the Mach-Zehnder modulators crosses both waveguide arms of the other Mach-Zehnder modulator.

16. The modulator arrangement as claimed in claim 1, wherein the at least one optical waveguide of the first Mach-Zehnder modulator crosses the at least one optical waveguide of the second Mach-Zehnder modulator by intersecting that optical waveguide.

17. The modulator arrangement as claimed in claim 1, wherein at least one of the crossing optical waveguides comprises at least one curved section.

* * * * *

UNITED STATES PATENT AND TRADEMARK OFFICE
CERTIFICATE OF CORRECTION

| | | |
|---|---|---|
| PATENT NO. | : 11,726,381 B2 | Page 1 of 1 |
| APPLICATION NO. | : 16/971367 | |
| DATED | : August 15, 2023 | |
| INVENTOR(S) | : Alessandro Aimone | |

It is certified that error appears in the above-identified patent and that said Letters Patent is hereby corrected as shown below:

On the Title Page

Item (57), Column 2, Line 1, delete "arrangement," and insert -- arrangement --

In the Claims

Column 9, Line 4, Claim 3, after "arms of" insert -- one of --

Column 10, Line 7, Claim 11, delete "otpical" and insert -- optical --

Column 10, Line 35, Claim 14, delete "Mach- Zehnder" and insert -- Mach-Zehnder --

Signed and Sealed this
Tenth Day of October, 2023

Katherine Kelly Vidal
*Director of the United States Patent and Trademark Office*